United States Patent [19]

Hughes

[11] Patent Number: 4,875,215
[45] Date of Patent: Oct. 17, 1989

[54] FIBRE COMMUNICATION LASER SYSTEM

[75] Inventor: John L. Hughes, Melbourne, Australia

[73] Assignee: Australian Electro Optics Pty. Ltd., Melbourne, Australia

[21] Appl. No.: 231,512

[22] Filed: Aug. 12, 1988

[51] Int. Cl.[4] .................................................. H01S 3/30
[52] U.S. Cl. .......................................... 372/6; 322/92;
350/96.15; 350/96.29
[58] Field of Search .................. 372/6, 92, 66; 378/62,
378/99; 350/96.15, 96.29

[56] References Cited

U.S. PATENT DOCUMENTS

| | | | |
|---|---|---|---|
| 4,358,851 | 11/1982 | Scifres et al. | 372/6 |
| 4,682,335 | 7/1987 | Hughes | 372/6 |
| 4,713,822 | 12/1987 | Lee | 372/69 |

Primary Examiner—Léon Scott, Jr.
Attorney, Agent, or Firm—Edwin D. Schindler

[57] ABSTRACT

This invention relates to a modular, interconnecting component optical fibre based communication system with coherent and incoherent optical signals from local area networks being converted into laser signals at either end of long-haul land or submarine cables incorporating laser amplifier repeaters, connecting said networks. The invention can accommodate both amplitude and frequency modulation signal transmission and detection. The invention has applications in high data transfer rates between local, national and international communication centers and can be utilized in vehicles where system weight and data rate capabilities are important.

10 Claims, 3 Drawing Sheets

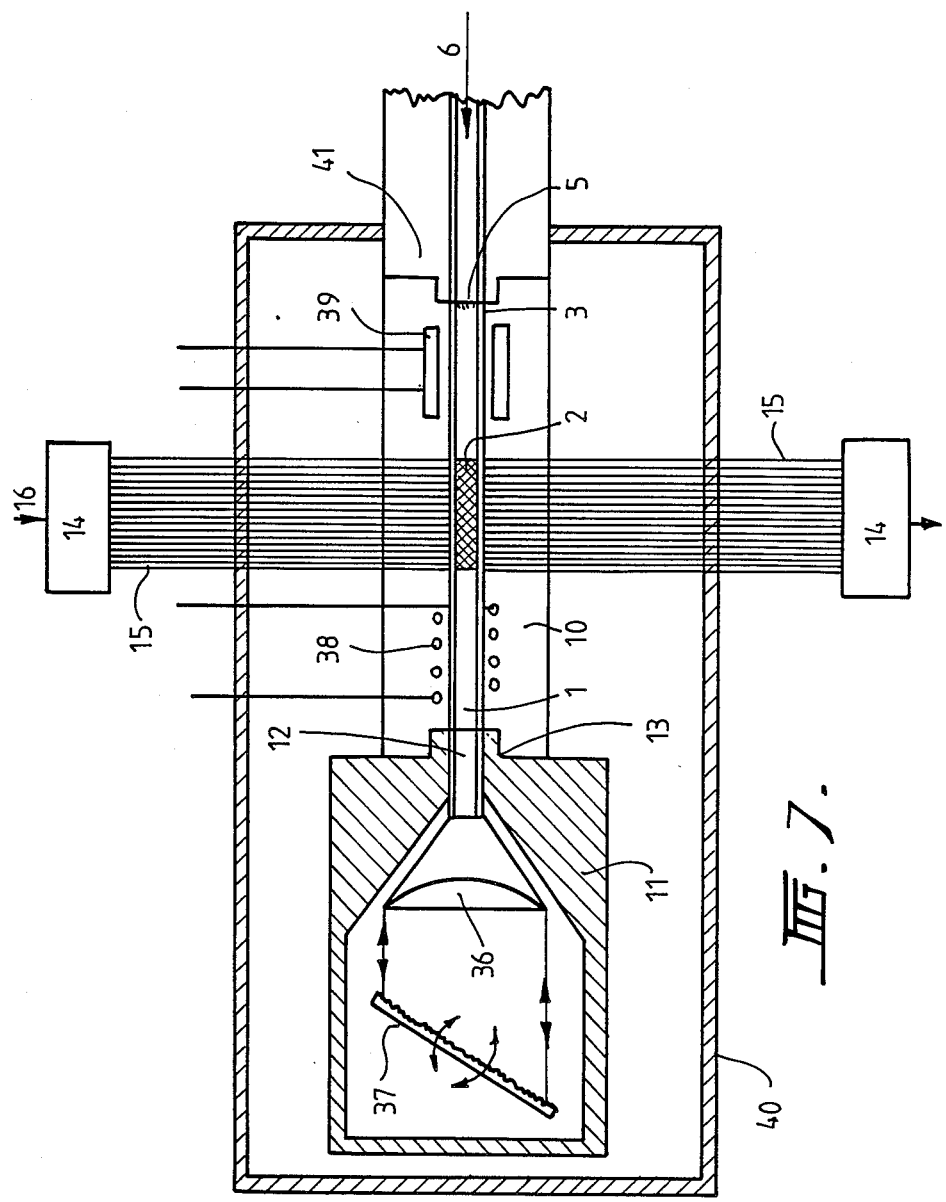

FIBRE COMMUNICATION LASER SYSTEM

FIELD OF THE INVENTION

This invention relates to a modular, optical fibre based laser communication system consisting of sectionally doped optical fibre in both the laser oscillator and laser amplifier interconnecting modules, with the overall information transmitting sequence being electrical signals to incoherent optical signals to laser beam signals to optical detection to electrical signals although for the highest data rates the transmitting sequence could be restricted to the laser beam portion of said system. The amplifier sections of the invention ranging up to several meters in length may be excited via optical or nuclear radiation.

The invention has applications in transmitting information between two or more local area communication networks separated by long-haul surface or submarine optical cables with passive repeaters. The invention can handle signals from, and into, local area networks which are incoherent or coherent, for example from both light emitting diodes and from laser sources. A local area network can include a single room, a single building, a group of buildings, a suburb or a whole city or even groups of cities bearing in mind that a single room containing a very large computer could have the data transfer rates of large cities under normal operating conditions.

SUMMARY OF THE PRIOR ART

Prior art optical communications systems depend heavily on the well-known Rayleigh scattering law for light propagating within various media which states that the scattering rate is proportional to the inverse fourth power of the wavelength. This means that, with all other factors being equal, this fundamental factor will dramatically favour optical communications networks operating at longer rather than shorter wavelengths. Even in the near infra-red region of the electro magnetic spectrum the scattering of 1,500 nanometer light compared to that of 1,000 nanometer light favours the former longer wavelength in that between 3 and 10 times less repeaters are required in long-haul links leading to a significant cost saving as well as to increasing the links' reliability, bearing in mind that the prior art repeaters are prone to malfunction. Prior art optical communication systems have gradually progressed from operating around 800 nanometer wavelengths to 1500 nanometer wavelengths in an effort to beat the scattering problem. However, a new penalty creeps in, in that the longer the infra-red wavelength the more difficult it is to detect the optical signals in the presence of thermally induced background noise. In other words, cryogenic cooling of the detectors is the order of the day. This goal of prior art optical communications systems to gain maximum advantage from long wavelength operations does introduce many complexities into the repeater problem particularly in submarine cables, due to the increasing difficulties of generating and detecting the longer wavelength signals. Prior art optical communication systems have not yet been utilized in a single link exceeding two thousand kilometers. Even under the best conditions possible for such 2000 kilometer link, one would require 15 broken path repeaters at 1,500 nanometers and over 40 such repeaters at 1,300 nanometers, such is the power of the Rayleigh scattering law. If low scattering glasses can be produced for the core of optical fibres, and fluoride based glasses appear to offer good prospects here, then they are made low loss fibres simply because they can transmit longer wavelength laser light. However, fluoride glasses tend to be very brittle compared with glasses used to transmit visible light. In contrast to prior art optical communication systems which are highly dependent on the operating wavelength, the present invention can operate independently of wavelength in the sense that the sectional doping of the optical fibre core provides for a very simple laser repeater which is optically pumped via light injected from both ends of the optical fibre cable or nuclear radiation pumped via radio-active material coated onto the said fibre. Although the long wavelength fibres still require much less of these repeaters than would be the case with visible wavelengths, for example, the scattering losses are no longer a fundamental barrier in terms of repeater costs even in very long-haul submarine cables which can have lifetimes of a thousand years in this invention instead of the 25 year lifespan of prior art submarine cables which were handicapped by the extreme complexity of their broken path optical-electronic repeaters whose power requirements led to very complex cable structures compared to the simple cables of the present invention. In order to amplify weakening signals in prior art optical repeaters the optical cable is actually cut and the repeaters inserted. The construction of the prior art repeaters are conceptionally simple in that the optical signal is detected via an optical detector, changed into an electrical signal which is then amplified to a level where it can power a laser diode transmitter. In fact, prior art optical communications systems are a series of separate optical circuits. In practice such circuits tend to be complex and require duplication in case of failure in very difficult to access environments. Since a series of prior art optical repeaters demand a continuous electrical power consumption for their operation it is necessary to insert metallic electrical conductors along the whole length of the prior art optical communications cables. Voltages as high as 7,000 volts must be applied to the ends of long, prior art submarine cables to activate the necessary series of prior art optical repeaters and such complex cables have to be grounded to the ocean floor for both operating and safety reasons. The present invention overcomes the fundamental defects limiting the lifetime of prior art submarine optical cables simply by removing the need for active, broken path repeaters and their power supply needs. This fundamental difference allows for the construction of what is essentially a very simple optical cable, with passive, continuous, sectionally doped lengths of optical fibres embedded in a flexible moulding which is itself protected by layers of material to protect the structure from the ravages of the seas for a thousand years and more.

The input and output ends of prior art long-haul optical cables are terminated by laser beam transmitters and optical detectors, individual optical fibre links being a laser beam transmitter at one end and an optical detector at the other so that a minimum of two such optical fibre links within said cable allows for two way transmissions of data.

Prior art laser signal generators at the ends of long-haul cables have been in the form of semiconductor lasers directly modulated with modulated electrical signals. On the other hand, local area networks feeding signals into these semi-conductor laser oscillators at the ends of the long-haul prior art cables have been of two forms, either semi-conductor laser based or light emitting diodes based, the former transmitting coherent light signals the latter, incoherent signals. In these prior art optical communications systems, there was an optical-electrical-optical link between the local area networks and the long-haul cable. In the present invention the electrical sections of the network and the local area network-optical cable junction can be eliminated and the connection be all optical so that we can gather either coherent or incoherent optical signals directly from the local area networks and use our new laser oscillator transmitters to combine them in such a manner that an all laser signal is injected into long-haul cables.

This optical to optical signal format at the junction of local area networks and long-haul optical cables gives rise to new laser oscillator transmitters which accommodate to the optical-optical link as well as being able to accommodate the electrical to optical links. However, in contrast to the prior art laser oscillator transmitters, the electrical-optical link is in two optical stages. For example, if the new laser oscillator transmitters are excited by laser diodes then the electrical signal to the said diodes is converted into a coherent signal output which is then used to excite the lasing ions doped into the fibre oscillators which then emit the actual coherent signal for injection into the long-haul cable. If the new oscillators are excited via light emitting diodes then the sequence becomes electrical signal to incoherent optical signal to coherent optical signals. As discussed above, the electrical signals can be dispensed with altogether in the new oscillators so that we can have either coherent-coherent optical links or an incoherent-coherent optical link depending on whether or not the local area network feeding the cable is laser diode or light emitting diode based. In other words, the present invention can handle electrical, laser of incoherent optical signals from local area networks and inject them as laser beam signals into long-haul cables. So far we have discussed the operation of the invention as a communication network with amplitude modulation because this provides for the simplest of optical technologies. However, the cost of the more expensive, stabilised laser oscillators for frequency modulation can also be justified at least for the long-haul cable sections and also for the very high data rate sections of the local area networks. For frequency modulation, one has to modify the operational modes of the laser oscillator by shifting the optical frequencies and then comparing these shifted frequencies with a standard frequency circulating the network of the invention. The difference between the shifted and standard frequencies can then be extruded as either an optical or electrical signal. The need for the standard frequency means that many stable laser oscillator outputs are required. Prior art optical fibre networks have not incorporated laser oscillators of the required tunability and stability for the use of frequencing modulation in operational systems. The laser oscillators of this invention can provide the required stability for injecting a standard frequency reference into the said laser communications system. Frequency modulation can then be accomplished downline of the said oscillator using prior art techniques.

Prior art fibre based optical communications links with doped fibres have yet to be installed in commercial networks. Such prior art optical communications links have the doped lasing ions uniformly distributed throughout the length of the fibre core as a consequence of their fibre pre-form manufacture. These prior art doped fibre core optical communications systems suffer because the excitation light propagating along the doped core is absorbed along the length of said core in particular over its end regions. Also, side excitation of the doped core is impractical due to the relatively low doping levels used in the whole core doping. In other words, the excitation of the doped core has to be distributed along the whole length of the fibres and under such circumstances there is nothing to prevent the whole fibre link self-oscillating depleting the energy stored for laser beam signal amplification in the process. Some prior art experimental systems being anticipated, will attempt to overcome the self-oscillation problem by the insertion of prior art broken path repeaters thus reintroducing the old prior art repeater problems in complex cable structures. The present invention overcomes the difficulties of prior art fibre laser repeater components for optical communications systems via the sectional doping of the fibre cores with relatively high concentrations of lasing ions. A unique advantage of a sectionally doped core laser amplifier over a continuously doped fibre core amplifier is the high loss rate for the spontaneously emitted light of the doped sections as it enters the undoped region which conducts the laser light signal with low loss. Sectional doping also allows the excitation light to be absorbed over the exact section of the optical fibre amplifier required thus allowing for concentration of the side pumping light sources and the low absorption of the core excitation path except over the doped region. The lasing ions placed in the optical fibre core can be excited to their lasing threshold via excitation light which propagates along the said core, enters perpendicular to the axis of said core over the sectionally doped region or via a combination of both excitation processes, both laser oscillator and amplifier configurations have longer lengths of undoped core sections than doped sections, the doped ion concentration being up to a few percent by weight of the fibre core composition over the doped section. The doping of the fibre cores can either be accomplished via thermal diffusion or ion beam implantation techniques of prior art. Also the laser oscillator and amplifier sections of the invention can contain doped sections which act as lenses and optical coupling telescopes, again these dopings being over clearly defined sections of the components of the present invention.

To provide more flexibility in matching the excitation light into the absorption bands of the laser ions doped into the core of the optical fibres of the invention, non-lasing ions, but ions with broad absorption bands can also be doped into the said core so as to provide means of matching the excitation light more fully into the absorption bands of the lasing ions. Also, to clean up the signals distorted by the propagation through long lengths of optical fibre links of the invention, further ions of particular light absorption properties can be doped into the fibre core. On the other hand, the wavelength band of the signal itself must not be significantly absorbed by any of these absorptive ions.

BACKGROUND OF THE INVENTION

The background experience culminating in the optical techniques of the present invention stems from the inventor's pioneering work in firstly laser-particle physics (Nature—May 1963), secondly in laser radar, firstly at the Royal Radar Establishment, Malvern, UK (1963-64) then at the Weapons Research Establishment, Salisbury, South Australia under the auspices of the British-Australian Joint Projects Board. The early experiments on optical fibre transmission of laser light was carried out at the Royal Radar Establishment in 1963 with a view of developing advanced, fibre optic coupled laser radar systems rather than for optical communications networks. Unfortunately, the optical quality of optical fibres in those early days were not very good and scattering losses were very high. However, in laser radar transmitters it was not the scattering losses per se that was the problem rather the fact that the fibres then available were severely multimode and the coherent laser beam input was immediately distorted into an incoherent optical beam. However, advanced phased-array laser radars which emerged from these pioneering experiments at the Royal Radar Establishment in 1963 have one thing in common with optical communication systems, namely, their individual, sectionally doped optical fibre oscillator-amplifier links are virtually identical with the length of the doped section in the oscillators ranging from a few millimeters to a few centimeters whilst the length of the doped sections firing the amplifier can be up to ten meters. The fundamental difference between phased-array laser radar utilizing optical fibres and optical communications systems is that in the former the phased-locked optical fibre bundles are packed to one million per square centimeter of the radar's transmitting aperture whilst a single strand of optical fibre is adequate for an optical communications network link. In terms of optical techniques, both phased-array laser radar techniques and optical communications techniques are, to a great extent, interchangable so that this invention has benefited by the channelling of the extensive background experience associated with the developments of laser radar since 1963. Radio active pumping is an alternative to optical excitation of the doped sections of the fibres because of the relative low power requirements of the repeaters of the invention.

OBJECTS OF THE INVENTION

It is an object of the invention to provide an interconnecting modular optical communications system consisting of a long-haul, land or submarine optical fibre cable, connecting together one or more local area optical communications network from each end of said cable which itself consists of two or more, appropriately packed optical fibres whose cores have been sectionally doped with lasing ions to provide for photon and/or particle excited, passive repeaters for amplifying said laser signals as they propagate along said fibres without setting the cable fibre link into self-oscillation.

It is an object of the invention to provide an optically excited laser oscillator system which can accept both coherent and incoherent optical signals and combine them into a laser signal which can be injected into and propagated along long-haul land or submarine optical cables.

Another object of the invention is to provide a communications link based on the following sequence—electrical signal to incoherent optical signal, to coherent optical signal to electrical signal.

Yet another object of the invention is to provide an optical communications system with the following sequence, electrical signal—coherent optical signal—electrical signal.

It is an object of the invention to provide a laser oscillator transmitter for optical communications which is composed of a single mode optical fibre, embedded in a transparent glass or plastic moulding, whose ends are optically polished, said polished ends having laser mirrors on them, one of which is fully reflecting at the lasing wavelength whilst the other is partially reflecting and partially transmitting at the laser wavelength said optical fibre being doped with lasing ions over a portion of its length and optically excited in a direction perpendicular to the axis of the core of the said fibres.

Another object of the invention is to provide a laser oscillator where one of the mirrors of said oscillator is optically flat whilst the other is concave, the output of said laser oscillator emerging through the flat mirror whilst the sectionally doped active region is excited via a focussed beam of optical excitation radiation via the conical end mirror.

It is an object of the invention to provide sectional doping of optical fibre cores with lasing ions which are excited to their lasing threshold via excitation light which propagates along said core, enters perpendicularly to the axis of said core over the sectionally doped region or via a combination of both excitation processes.

Another object of the invention is to provide additional dopants into the said core of the optical fibre links so that their broad absorption bands can aid in the transfer of excitation light into the lasing ions or absorb unwanted components of a signal distorted via propagation along the said fibre core.

It is also an object of the invention to provide the sectionally doped amplifiers with a radio activity activated source of excitation energy within a simplified long-haul fibre optic cable.

It is an object of the invention to provide matching means between its laser oscillator and laser amplifier modules via the doping of the core of the laser beam transmitting fibres to act as optical rod lens couplers.

Another object of the invention is to provide optically excited, passive laser beam repeaters within simple long-haul cable structures which allow for the operation of said optical cables over a wide range of laser wavelengths not confined to the infra-red region of the electromagnetic spectrum.

It is an object of the invention to provide for the generation, propagation and coherent detection of laser beams of a stability consistent with the frequencing modulation of said optical signals. Frequency modulation and coherent detection techniques improve both the data transfer and the repeater separation of the invention.

BRIEF DESCRIPTION OF THE DRAWINGS

A better understanding of the invention may be obtained from the following considerations taken in conjunction with the drawings which are not meant to limit the scope of the invention in any way.

FIG. 7 shows the configuration of a tunable, stabilized model of the laser oscillator of the invention which can also be used for generating the coherent detector beam. To ensure the minimum heat distortion of the laser oscillator the excitation light is conducted from the semiconductor light sources via optical fibres and the oscillator modules are enclosed in a control temperature environment.

DETAILED DESCRIPTION OF THE INVENTION

Figure 1:
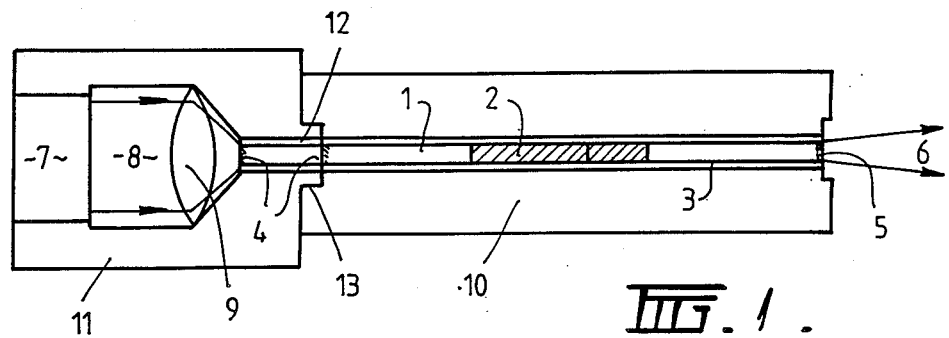
FIG. 1 shows the end excited, sectionally doped laser oscillator of the invention with a single length of single mode optical fibre, optically polished and mirrored at each end, the whole assembly being moulded into an optically transparent glass or plastic body provided with means of coupling said component to other sections of the invention.

In FIG. 1 numeral 1 indicates the core of the single mode optical fibre in which the laser light is generated and propagates. Numeral 2 indicates the section of 1 which is doped with laser ions which acts as the gain medium. The doped section 2 can be produced by the implantation of lasing ions from an ion accelerator or via thermal diffusion of said ions into 1. It should be noted that non-lasing ions can also be implanted into sectional regions 2 to increase the absorption efficiency of the excitation light which is then re-emitted in the form of photons which can be readily absorbed by the lasing ions. A third class of ions can also be implanted into core 1, namely those ions capable of selecting the propagation range of the laser signal but alternating said signals outside a given bandwidth.

In FIG. 1, numeral 3 indicates the sheath surrounding core 1 of the optical fibre, said sheath being of different refractive index to core 1 so as to contain the propagation signal in 1 as is well known in the art. Numeral 4 indicates a laser beam reflector of 100% reflectivity at the laser wavelength but of low reflectivity at the excitation light wavelength. Numeral 5 indicates the fibre laser oscillator output mirror, also deposited onto the optically polished fibre end as was the case with 4. However, laser reflector 5 is not 100% reflective at the laser wavelength so as to allow for the emission of the laser output. On the other hand mirror 5 is 100% reflecting at the excitation light wavelength. Numeral 6 indicates the diverging laser output beam.

In FIG. 1, numeral 7 indicates a semiconductor light source which may be in the form of a laser diode or light emitting diode array which emits a beam of excitation light indicated by numeral 8. Numeral 9 indicates a lens which focusses excitation beam 8 into the fibre core 1 via mirrored end 4 so that it propagates along core 1 to excite the lasing ions in sectionally doped region 2. The excitation light 8 not absorbed on the first passage through sectionally doped region 2 is reflected back into such doped region via mirror 5.

In FIG. 1, numeral 10 indicates a transparent moulded glass or plastic sheath in which the single mode fibre laser oscillator is embedded. Numeral 11 indicates the moulded sheath into which components 7 and 9 are embedded together with the coupling fibre indicated by numeral 12. Numeral 13 indicates the joint which couples 10 to 11 to also ensure good optical coupling between the optical fibres.

Figure 2:
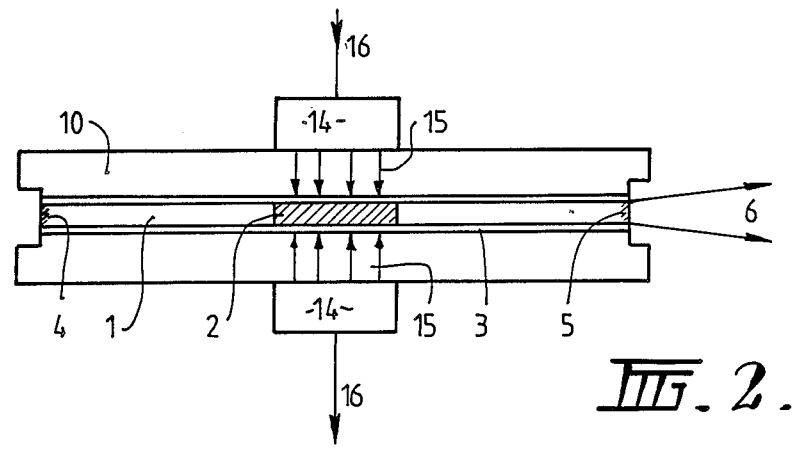
FIG. 2 shows a laser oscillator section of the invention with the sectionally doped optical fibre being optically excited perpendicularly to the axis of said fibre through its transparent sheath either directly or via optical rods moulded into said sheath.

In FIG. 2, numeral 14 indicates a modulated semiconductor light source which provides a means of both converting a modulated electrical current into a modulated light beam which may be coherent or non-coherent depending on whether 14 is a laser diode array or a light emitting diode array. The modulated output of semiconductor source 14 is indicated by numeral 15 and can either propagate directly through the transparent sheath 10 or can be conducted via optical fibres embedded in 10 which then need not be of optically transparent material. Excitation light 15 enters the sectionally doped region 2 of core 1 and excites the ions above lasing threshold of the laser oscillator cavity defined by mirrors 4 and 5 and core 1. Numeral 16 indicates the electrical leads through what the electrical signals from a source not shown are transmitted to semiconductor light source 14. It should be noted that modulated light signals at the excitation light wavelength can be injected directly into core 1 via mirror 4, said modulation then being transferred to output beam 6.

Figure 3:
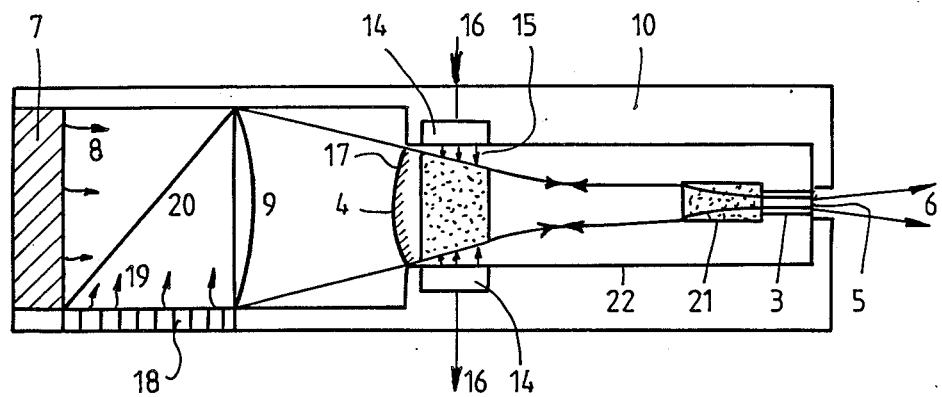
FIG. 3 shows a laser oscillator configuration of the invention with both end and side excitation of the sectionally doped oscillator medium, said oscillator having a doped ion telescope to match the smaller diameter output beam to the rear end of said laser oscillator section. It should be noted that the side excitation of the laser oscillator is partly direct via the transparent body of the oscillator structure and partly via optical fibre couplers.

In FIG. 3, numeral 17 indicates the concave, optically polished end of the laser oscillator. Numeral 18 indicates a modulated optical signal at the excitation light wavelength which is directed via the beam path indicated by numeral 19 so as to be reflected off the partial beam splitter indicated by numeral 20 into the path of beam 8 to be focussed by lens 9 into the laser oscillator cavity defined by mirrors 4 and 5 so as to excite sectionally doped region 2. Numeral 21 indicates a second sectionally doped region of said laser oscillator which is ion doped to produce a rod micro-lens as known in the art to match the few mirror diameter output end beam path of said oscillator to the much larger diameter beam path of its rear end, said increased beam path dimensions simplifying the optical excitation of said laser oscillator, now in the form of host medium block indicated by numeral 22.

Figure 4:
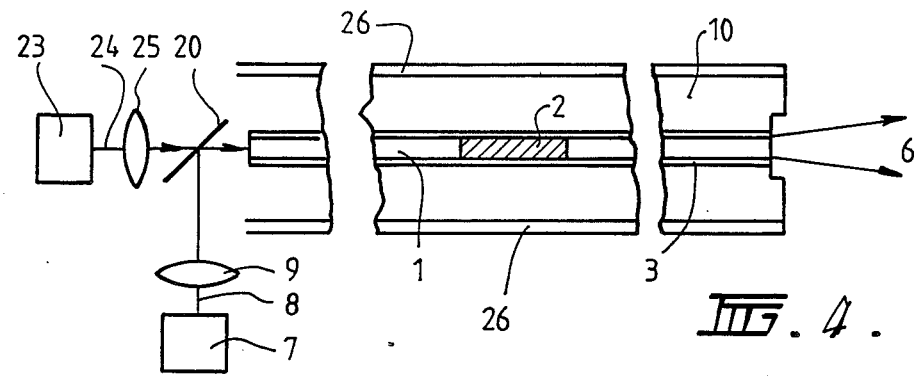
FIG. 4 shows the laser amplifier configuration of the invention with both optical signal and optical excitation light being injected from one end using a detachable module.

In FIG. 4, numeral 23 indicates the optical signal source of the form shown in the previous figures. Numeral 24 indicates the signal beam path whilst numeral 25 indicates the signal beam coupling lens into fibre core 1 via beam splitter 20. The excitation light from source 7 via beam path 8 and coupling lens 9 is passed along core 1 of the long-haul cable to excite passive repeater in the form of sectionally doped region 2 which in turn amplifies the signal beam as it propagates through core 1. Numeral 26 indicates the outer protective cover of the fibre optical cable sheath 10.

Figure 5:
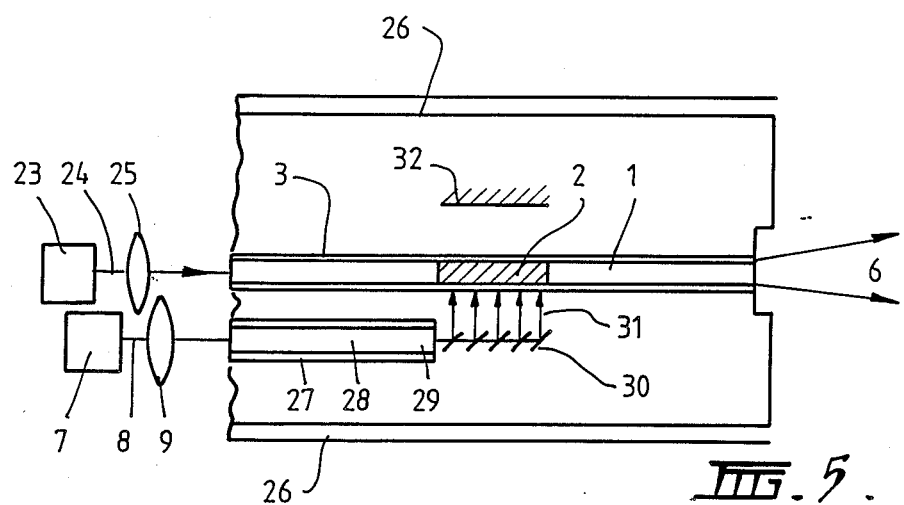
FIG. 5 shows a configuration of the cable links of the invention where the optical excitation light is fed to the passive repeater via a separate optical fibre which can be excited from both ends of said cable link.

In FIG. 5, numeral 27 indicates the cladding of core 28 of a separate conduction channel for the excitation light which emits through the end face indicated by numeral 29 into a scattering micro-array indicated by numeral 30 which directs the excitation light indicated by numeral 31 with the aid of the reflector indicated by numeral 32 into the doped region 2 of the optical fibre link core 1 of the long-haul cable. It should be noted that a single cable could then contain two or more signal links with passive repeaters 2 each of which is excited by its own excitation fibre.

Figure 6:
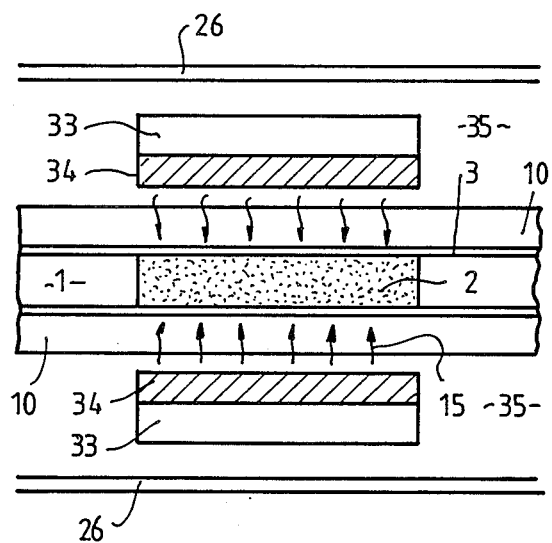
FIG. 6 shows a configuration of the optical fibre cable link of the invention where the sectionally doped laser amplifiers are optically excited via excitation light generated via the excitation of the light source via the particle and photon products of a radio-active source placed within the body of said cable in a manner consistent with long life operation of the cable.

In FIG. 6, numeral 33 indicates a long life radio-active source which activates the light emitting source indicated by numeral 34 to provide the optical excitation of the amplifier region 2. Numeral 35 indicates the region of the optical fibre cable into which the radio-active source 33 is embedded for maximum long term protection of sheath 10 and fibre core 1 and cladding 3.

In FIG. 7, numeral 36 indicates a lens which couples the rear section of the stabilized laser oscillator of the invention, consisting of a movable diffraction grating indicated by numeral 37, to the front end of said oscillator consisting of the sectionally doped fibre via the coupling fibre 12. Numeral 38 indicates a heating coil for the expansion tuning of core 1 whilst numeral 39 indicates a Peltier cooler for the contration tuning of core 1. The whole of the stabilized laser oscillator is enclosed in a temperature controlled oven indicated by numeral 40. This stabilized laser oscillator of FIG. 7, produces a laser beam output 6 which is represented by a very narrow bank of wavelengths or even a single wavelength which can be tuned over the lasing bandwidth of doped ions 2 by adjusting diffraction grating 37. The excitation light for 2 is conducted via optical fibre bundles 15 so as to eliminate heat distortion in the excitation process. Phase or frequency modulation of the stabilized output of the oscillator of FIG. 7 is carried out down line of said oscillator using modulations of the prior art. The stabilized laser oscillator of FIG. 7 can be used both for the generation and for the coherent detection of said laser signals in the frequency modulated configuration of the invention.

The modular construction of the invention allows for its various laser oscillator configurations to be simply coupled to the ends of its long-haul cables and optical links within local area networks.

The invention has application in the transmission of high data rates between local and international communication networks via both land and submarine links which have lifetimes in excess of 1000 years. The invention can also be utilized within the confined spaces of military and civilian vehicles such as aircraft where the weight and data rate advantages of the invention are significantly in its favour.

Modifications may be made to the above teachings by those skilled in the art without departing from the spirit of the invention.

I claim:

1. A modular optical communications system interconnecting, sectionally doped, laser oscillator and laser amplifier modules, said laser oscillator module consisting of a short length of single mode optical fibre optically polished at both ends, on which are laser beam reflectors, and sectionally doped with lasing ions which are optically excited said fibre length being embedded in a moulded sheath whilst the said amplifier module comprising a complete long-haul section of optical fibre cable with the core of the optical fibre within said cable being doped in sections along the cable to form a series of laser repeaters which are optically excited said cable having two or more optical fibre links embedded in a moulded, transparent sheath, itself sheathed for long life protection from its environment.

2. A modular optical communication system as claimed in claim 1 where the optical excitation light is directed along the axis of the fibre core, perpendicular to said core or a combination of both.

3. A system as claimed in claim 1 where the excitation light directed perpendicular to the axis of the core of the optical fibre propagates directly through the optically transparent sheath in which the fibre is embedded, or via optical fibre links from the course of said optical exciters to the doped region of said optical fibre core.

4. A system as claimed in claim 1 where the oscillator is unstabilized and is defined by two mirrors, the output mirror being flat and the rear mirror being concave and of much larger dimensions allowing for a much larger doped section volume which is optically excited via coherent and/or incoherent light both through the said concave mirror and via the body of the laser oscillator medium.

5. A system as claimed in claim 1 where the laser amplifiers are excited with light propagating along the signal fibre.

6. A system as claimed in claim 1 where the laser amplifiers are excited with existing light propagating along separate fibres and coupled into said amplifier sections via beam scatters and reflectors embedded in the moulded sheath of said cable.

7. A system as claimed in claim 1 where the laser amplifier section in the long-haul optical fibre cable is excited via radio-active, long life sources embedded in the outer sheaths of said cable.

8. A system as claimed in claim 1 where coherent, incoherent optical and electrical signals from local area networks are transformed into laser signals at either end of the long-haul cable modules thus interconnecting said local area networks for high data rate transmissions.

9. A system as claimed in claim 1 with a signal transmission sequence represented by modulated electrical current. incoherent, modulated light signal and coherent modulated light signal to modulated electrical current.

10. A modular coherent beam optical communications system consisting of interconnecting, sectionally doped modules including:

(a) A stabilized, tunable laser oscillator coherent beam generator consisting of a front end composed of a short length of sectionally doped, single mode optical fibre optically polished at both ends with a partially reflecting mirror on its output end and an anti-reflection coating on the other which couples into a short length of single mode optical fibre optically polished and anti-reflection coated at both ends, said second length of single mode optical fibre being moulded into the body of the rear section of said stabilized oscillator which consists of a lens and a movable diffraction grating mounted within said body of the rear section which is sealed into the body of the said front section to form a single body, said doped section of the said body being optically excited via a bundle of optical fibres moulded into said body and coupled into remotely sited semiconductor light sources to minimise thermal distortions and to thermally tune the optical cavity of said laser oscillator both a heating coil and a Peltier cooling stack surrounds the said single mode fibre both of which are moulded into said body, the whole oscillator structure is contained within a temperature controlled environment;

(b) A laser amplifier module consisting of the complete long-haul section of optical fibre cable with the core of the optical fibre within said cable being doped in sections along the cable to form a series of laser repeaters which are optically excited said cable having two or more optical fibre links embedded in a moulded, flexible transparent sheath, itself sheath for long life protection from its environment;

(c) A coherent detection module consisting of a tunable, stabilized laser osciilator as in (a) above whose output is mixed with the coherent signal so that the resulting waveforms can be converted into detectable signals over the whole bandwidth of the coherent signals.

* * * * *